March 14, 1939.  C. WACHTLER  2,150,642
PHOTOGRAPHIC CAMERA
Filed May 3, 1938  2 Sheets-Sheet 2

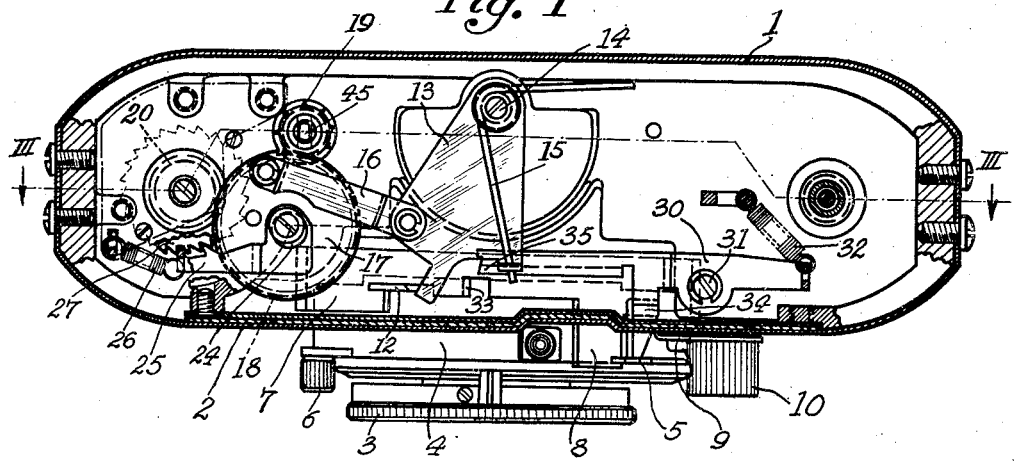

Inventor
Conrad Wachtler
by B. Singer and
F. Stern
Attorneys

Patented Mar. 14, 1939

2,150,642

UNITED STATES PATENT OFFICE 2,150,642

PHOTOGRAPHIC CAMERA

Conrad Wachtler, Dresden-Loschwitz, Germany, assignor to Zeiss Ikon Aktiengesellschaft, Dresden, Germany Application May 3, 1938, Serial No. 205,811
In Germany May 4, 1937

11 Claims. (Cl. 95—31)

The invention relates to improvements in photographic cameras and particularly is directed to a rollfilm camera using standard motion picture film as negative material.

It has been proposed heretofore to provide rollfilm cameras of this type with a shutter which is operatively coupled with the film advancing device, in such a manner that upon tensioning the shutter the film advancing device is operated at the same time to advance the film one step to bring the next unexposed portion of the film into axial alinement with the photographic objective.

It is an object of the present invention to provide the rollfilm camera with a single manually operable member adapted to simultaneously actuate a shutter tensioning lever, the film advancing device and an exposure counting means.

Another object of the invention is to arrange the aforesaid manually operable member in such a position on the camera that it may easily be operated by a finger of the hand which holds the camera in operative position, ready for taking a picture. It is now possible to make a number of exposures in quick succession, by merely operating the said manually operable member after each release of the shutter, thereby increasing substantially the readiness of the camera for taking pictures.

It is also an object of the invention to provide the camera with a safety device which is controlled by the shutter tensioning lever and prevents a second operation of the aforesaid manually operable member until the shutter has been released and the shutter tensioning lever has returned to its initial position in which it locks the safety device in an inactive position.

Still another object of the invention is to provide the camera with means adapted to permit a rotation of the customary film advancing sprocket, which normally is rotatable in one direction only, also in the other direction, when the exposed film wound upon the film take-up spool is to be returned, to the cartridge from which it was unwound during the taking of the pictures.

With these and other objects in view, as will be apparent or will be specifically pointed out in the following description, a preferred embodiment of the invention will now be described with references to the accompanying drawings, in which:

Fig. 1 is a horizontal sectional view of the rollfilm camera substantially along the line I—I of Fig. 2;

Fig. 2 is a front elevation view of the rollfilm camera, with a portion of the front wall broken away and certain parts in section.

Figure 4:
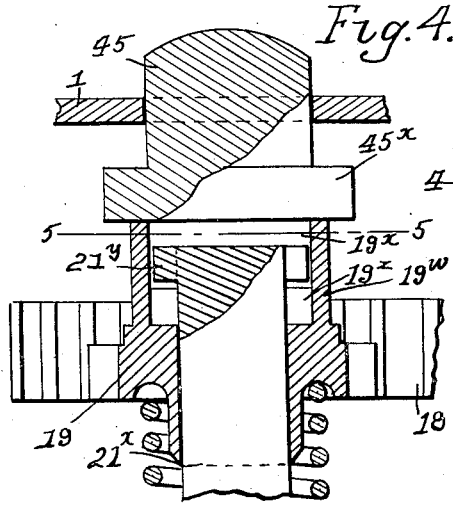
Figure 5:
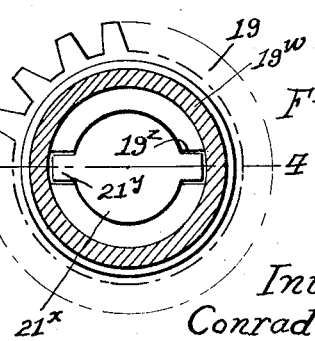

Fig. 4 is an enlarged detail section on the line 4—4 of Fig. 5 showing an arrangement whereby the gear 19, instead of being movable out of mesh with the gear 18, is designed to be disengaged from the shaft of the spool 21.

Fig. 5 is a horizontal section on the line 5—5 of Fig. 4.

Referring to the drawings, the camera casing 1 is provided with a front wall 2 to which is attached the photographic objective 3 combined with a shutter 4. The shutter 4 is provided with a tensioning lever 5 and a release lever 6 of conventional construction and arrangement.

In accordance with the invention the shutter tensioning lever 5 is operated by an axial projection 8 of an annular member 7 which is rotatably mounted within the camera casing 1 coaxially with respect to the photographic objective 3. The annular member 7 is provided with an operating arm 9 which extends outwardly from the camera casing and terminates adjacent the top wall of the same at a point where it easily may be engaged and operated by a finger of the hand which holds the camera in operative position ready for taking a picture. The axial projection 8 of the annular member 7 terminates directly adjacent the shutter tensioning lever 5 and actuates the same to tension the shutter when the annular member 7 is rotated clockwise (Fig. 2) by depressing the finger piece 10 on the outer end of the operating arm 9.

The annular member 7 is also employed for operating the film advancing device and an exposure counter of the camera at the same time the shutter 4 is tensioned. A radial projection 12 on the annular member 7 is provided for engaging the free end of the lever 13 which is pivotally mounted at 14 in the camera casing and normally is urged by a spring 15 into the position shown in Fig. 1. The lever 13 is connected by a link 16 with one member 17 of a one-way clutch, whose other member is formed by a gear 18 which meshes with two gears 19 and 20. The gear 19 is mounted in axial alinement with the film advancing sprocket 21 and is used to drive the latter in a manner as will be described hereinafter. The gear 20 is mounted in axial alinement with the film take-up spool and drives the customary coupling member 22 used for engaging and rotating the take-up spool.

The drive member 17 of the one-way clutch is provided with an eccentric hub portion 24 on which is mounted rotatably a pawl 25 with one of its ends. The other end of the pawl 25 is urged by a spring 26 in engagement with a ratchet wheel 27 coaxially connected with a counter disc 28 which in the present instance is arranged on the outside of the top wall of the camera casing 1 and indicates the number of exposures made on the film.

The operation of the above described film advancing device and exposure counter is believed to be obvious. When the finger piece 10 is depressed, the axial projection 8 of the annular member 7 tensions the shutter 4 as described and at the same time the radial projection 12 of the annular member 7 moves the lever 13 anticlockwise, when viewing Fig. 1, against the tension of the spring 15. The member 17 of the one-way clutch is rotated by the link 16 connected with the lever 13 and rotates the gear 18 which in turn rotates the gears 19 and 20 to advance the film sprocket 21 and the film take-up spool respectively a distance corresponding to the length of one picture frame. The eccentric 24 actuates the pawl 25 to advance the exposure counter 27, 28 one step.

When now the finger piece 10 is released, the spring 15 becomes effective and returns the lever 13 and therwith the annular member 7 including its operating arm 9, the drive member 17 of the one-way clutch and the pawl 25 into initial position as illustrated in Fig. 1. Only the shutter tensioning lever 5 remains in its tensioned position.

For the purpose of preventing a second actuation of the annular member 7, until the tensioned shutter 4 has been released and the film portion in the focal plane of the photographic objective 3 has been exposed, a very simple and effective safety latch is provided. This safety latch comprises a bar 30 pivotally mounted between its ends at 31 within the camera casing 1 adjacent the front wall 2 of the same. One end of the bar 30 is connected to a spring 32 tending to urge the other end 35 of the bar 30 toward the front wall 2 of the camera casing and into the path or in front of an axial shoulder 33 provided on the annular member 7. The bar 30 is provided with a lateral arm 34 projecting through the front wall 2.

In the released position of the shutter, as illustrated in Fig. 1 the shutter tensioning lever 5 engages the free end of the lateral arm 34 and thereby holds the bar 30 in a position in which its end 35 is moved outside the path of movement of the shoulder 33 on the annular member 7. Upon tensioning the shutter the shutter tensioning lever 5 is moved away from the lateral arm 34 and as soon as the annular member 7 has returned to its initial position,—the lever 5 remains in its tensioning position—the spring 32 becomes effective and oscillates the bar 30 about its pivot 31 and thereby moves the end 35 of the bar 30 directly in front of the shoulder 33 on the annular member 7. It thus is apparent that the annular member 7 and therewith the film advancing device and exposure counter cannot be operated until the shutter 4 is released by actuating the shutter release lever 6. When this has been done the shutter tensioning lever 5 returns to its initial position and thereby engages the lateral arm 34 of the bar 30 and moves the same against the action of the spring 32 into the position illustrated in Fig. 1 in which the end 35 of the bar 30 does no longer prevent another actuation of the annular member 7.

Figure 3:
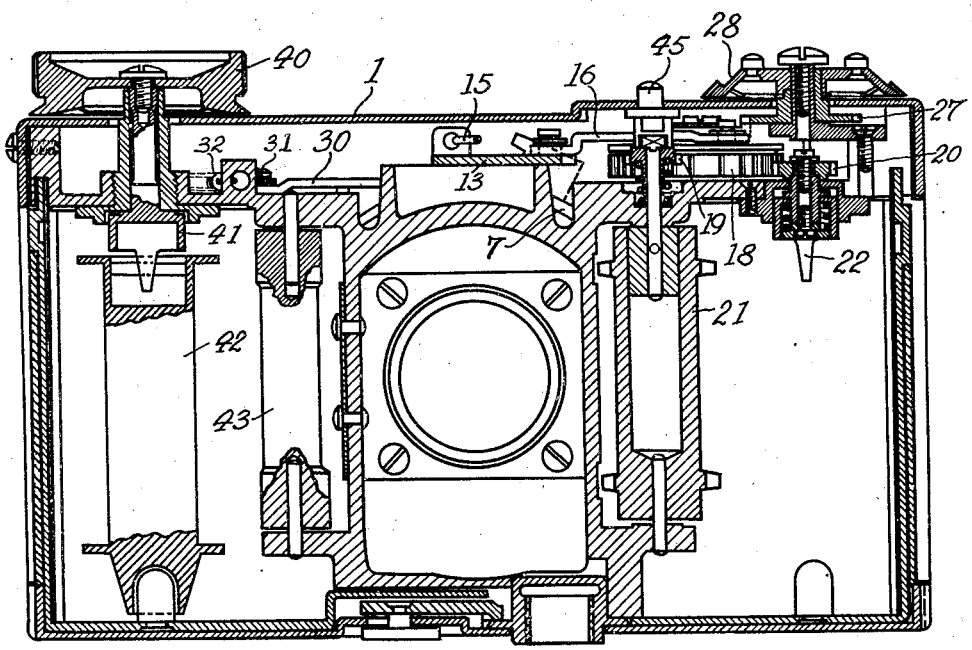
Fig. 3 is a vertical sectional view of the camera substantially along the line III—III of Fig. 1.

A rotatable knob 40 on the top wall of the camera casing 1 is operatively connected in customary manner with the supporting member 41 for the film supply spool 42, as illustrated in Fig. 3. The knob 40 is used for rewinding the film after it has been exposed and wound upon the film take-up spool. A rewinding of the exposed film is necessary when the photographer employs a film cartridge in place of the film supply spool 42, as is well known in the art. In order to permit such a rewinding of the film it is necessary that the film sprocket 21, which normally is rotatable in one direction only, be rendered rotatable in the opposite direction. This is accomplished, as shown by mounting the gear 19 axially movable, so that it may be moved out of engagement with the gear 18 which is driven by the one-way clutch always in one and the same direction.

In axial alinement with the axially movable gear 19 is arranged a manually operable pin 45 which projects outwardly through the top wall of the camera casing. When the photographer depresses the pin 45, the gear 19 is axially shifted out of driving connection with the gear 18 and the film sprocket 21 is now freely rotatable and permits a rewinding of the film into the cartridge. A customary film guide roller 43 is arranged adjacent the film supply spool 42 as disclosed in Fig. 3.

In Figs. 4 and 5 I have shown how the gear 19 may be rendered inoperative on the spool 21 while remaining in mesh with the gear 18. By this construction the shaft $21^x$ is provided with radial lugs $21^y$, or their equivalent, which normally seat in the radial recesses $19^z$ below the counter-bore $19^x$ of the collar $19^w$ of the gear 19. When the push button 45 is depressed its base $45^x$ will press down on the collar $19^w$ and will move gear 19 down until the lugs $21^y$ are out of the recesses $19^z$ and become located in the cylindrical counter-bore $19^x$ so that the gear 19 may rotate freely without rotating the shaft $21^x$.

What I claim is:

1. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, and a lever mechanism connected with said clutch for driving the same; an exposure counter operatively connected with said one-way clutch, and a manually operable member rotatable about the axis of said objective and having an arm terminating adjacent said top wall of said camera casing for simultaneously actuating said shutter tensioning lever, said exposure counter, and said lever mechanism in a direction in which said film sprocket advances the film.

2. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, and a lever mechanism connected with said clutch for driving the same; an exposure counter operatively connected with said one-way clutch, a manually operable member rotatable about the axis of said objective and having an arm terminating adjacent said top wall of said camera casing for simultaneously actuating said shutter tensioning lever, said exposure counter, and said lever mechanism in a direction in which said film sprocket advances the film, and spring means connected with said lever mechanism for returning the same and said manually operable member to initial position after each manual operation of the latter.

3. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, and a lever mechanism connected with said clutch for driving the same; and a manually operable annular member within said camera casing and rotatable about the axis of said objective and having an arm terminating outside said camera casing adjacent the top wall of the same for simultaneously actuating said shutter tensioning lever and said lever mechanism in a direction in which said film sprocket advances the film.

4. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, and a lever mechanism connected with said clutch for driving the same; a manually operable annular member within said camera casing coaxial with respect to said objective and rotatable about the axis of the latter, said annular member having an arm terminating outside said camera casing adjacent the top wall of the same and being provided for simultaneously actuating said shutter tensioning lever and said lever mechanism in a direction in which said film sprocket advances the film, and spring means connected with said lever mechanism for returning the same and said manually operable annular member to initial position after each manual operation of the latter.

5. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, and a lever mechanism connected with said clutch for driving the same; a manually operable member rotatable about the axis of said objective and having an arm terminating adjacent said top wall of said camera casing for simultaneously actuating said shutter tensioning lever and said lever mechanism in a direction in which said film sprocket advances the film, spring means connected with said lever mechanism for returning the same and said manually operable member to initial position after each manual operation of the latter, and means controlled by said shutter tensioning lever for preventing a second operation of said manually operable member until said shutter release means has been operated.

6. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, and a lever mechanism connected with said clutch for driving the same, a manually operable annular member rotatable about the axis of said objective and having an arm terminating adjacent said top wall of said camera casing for simultaneously actuating said shutter tensioning lever and said lever mechanism in a direction in which said film sprocket advances the film, and means controlled by said shutter tensioning lever for preventing a second operation of said manually operable member until said shutter release means has been operated, said means including a bar pivotally supported between its ends, a shoulder on said manually operable annular member, and spring means for moving one end of said bar in front of said shoulder after said manually operable annular member has moved said shoulder tensioning lever into shutter tensioning position, said bar preventing a second operation of said annular member until in response to a release of said shutter the shutter tensioning lever returns to initial position and moves said bar away from said shoulder into an ineffective position.

7. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, and a lever mechanism connected with said clutch for driving the same; a manually operable annular member rotatable about the axis of said objective and having an arm terminating adjacent said top wall of said camera casing for simultaneously actuating said shutter tensioning lever and said lever mechanism in a direction in which said film sprocket advances the film, a spring connected with said lever mechanism for returning the same and said manually operable annular member to initially position after each manual operation of the latter, means controlled by said shutter tensioning lever for preventing a second operation of said manually operable annular member until said shutter release means has been operated, said means including a bar pivotally supported between its ends, a shoulder on said manually operable annular member, and spring means for moving one end of said bar in front of said shoulder after said manually operable annular member has moved said shutter tensioning lever into shutter tensioning position and has returned to its initial position, said bar preventing a second operation of said annular member until in response to a release of said shutter the shutter tensioning lever returns to initial position and moves said bar away from said shoulder into an ineffective position.

8. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, one gear of said gearing being axially shiftable for disconnecting said sprocket from said one-way clutch, and a lever mechanism connected with said clutch for driving the same; a manually operable member rotatable about the axis of said objective and having an actuating arm terminating adjacent said top wall of said camera casing for simultaneously actuating said shutter tensioning lever and said lever mechanism in a direction in which said film sprocket advances the film, a film rewinding member on the outside of said camera casing, and means operable from the outside of said camera casing for shifting said axially shiftable gear.

9. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, one gear of said gearing being axially shiftable for disconnecting said sprocket from said one-way clutch, and a lever mechanism connected with said clutch for driving the same; a manually operable member rotatable about the axis of said objective and having an actuating arm terminating adjacent said top wall of said camera casing for simultaneously actuating said shutter tensioning lever and said lever mechanism in a direction in which said film sprocket advances the film, a film rewinding member on the outside of said camera casing, means operable from the outside of said camera casing for shifting said axially shiftable gear, and spring means connected with said lever mechanism for returning the same and said manually operable member to initial position after each manual operation of the latter.

10. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, one gear of said gearing being axially shiftable for disconnecting said sprocket from said one-way clutch, and a lever mechanism connected with said clutch for driving the same; an exposure counter operatively connected with said one-way clutch, a manually operable member rotatable about the axis of said objective and having an actuating arm terminating adjacent said top wall of said camera casing for simultaneously actuating said shutter tensioning lever, said exposure counter, and said lever mechanism in a direction in which said film sprocket advances the film, a film rewinding member on the outside of said camera casing, and means operable from the outside of said camera casing for shifting said axially shiftable gear.

11. In a rollfilm camera, a camera casing having a top wall, a photographic objective, a shutter provided with a shutter tensioning lever and a shutter release means, film advancing means including a film sprocket, a one-way clutch, a gearing between said sprocket and said one-way clutch, one gear of said gearing being axially shiftable for disconnecting said sprocket from said one-way clutch, and a lever mechanism connected with said clutch for driving the same; an exposure counter operatively connected with said one-way clutch, a manually operable member rotatable about the axis of said objective and having an actuating arm terminating adjacent said top wall of said camera casing for simultaneously actuating said shutter tensioning lever, said exposure counter, and said lever mechanism in a direction in which said film sprocket advances the film, a film rewinding member on the outside of said camera casing, means operable from the outside of said camera casing for shifting said axially shiftable gear, and spring means connected with said lever mechanism for returning the same and said manually operable member to initial position after each manual operation of the latter.

CONRAD WACHTLER.